(12) United States Patent
Lansdowne

(10) Patent No.: US 6,618,456 B1
(45) Date of Patent: Sep. 9, 2003

(54) ASYNCHRONOUS TIMING OSCILLATOR RE-SYNCHRONIZER AND METHOD

(75) Inventor: Richard Lansdowne, Southampton (GB)

(73) Assignee: Semtech Corporation, Newbury Park, CA (US)

( * ) Notice: Subject to any disclaimer, the term of this patent is extended or adjusted under 35 U.S.C. 154(b) by 0 days.

(21) Appl. No.: 09/422,409

(22) Filed: Oct. 21, 1999

(51) Int. Cl.[7] ............................................. H04L 7/00
(52) U.S. Cl. ........................................................ 375/354
(58) Field of Search ................................. 375/354, 377, 375/355, 357, 359; 360/50, 51, 52, 53; 331/2; 370/350, 503

(56) References Cited

U.S. PATENT DOCUMENTS

| | | | | |
|---|---|---|---|---|
| 4,935,920 A | * | 6/1990 | Taniguchi et al. | 370/55 |
| 5,513,209 A | * | 4/1996 | Holm | 375/354 |
| 5,790,609 A | * | 8/1998 | Swoboda | 375/357 |
| 6,333,939 B1 | * | 12/2001 | Butler et al. | 370/503 |
| 6,449,111 B1 | * | 9/2002 | Kool et al. | 360/48 |

* cited by examiner

Primary Examiner—Tesfaldet Bocure
Assistant Examiner—Dung X. Nguyen
(74) Attorney, Agent, or Firm—Koppel, Jacobs, Patrick & Heybl

(57) ABSTRACT

An asynchronous timing oscillator re-synchronizer enables a clocked system which uses a high frequency clock to measure time intervals to re-synchronize to the clock after it has been temporarily disabled, using a low frequency, low accuracy, low power clock to determine the number of high frequency clock cycles that would have occurred during such intervals. Both high frequency and low frequency clocks are provided to the re-synchronizer, and the ratio between their respective frequencies is periodically determined and stored. A command sent to the re-synchronizer disables the high frequency clock for a specified number of cycles of the low frequency clock. When the disablement period has expired, the high frequency clock is re-enabled. While the high frequency clock is disabled, a register is periodically incremented by the stored clock ratio, such that when the high frequency clock is re-enabled, the number in the register represents the number of high frequency clock cycles that would have occurred during the disablement period. This number is provided to the clocked system to re-synchronize the clocked system to the high frequency clock.

24 Claims, 2 Drawing Sheets

ASYNCHRONOUS TIMING OSCILLATOR RE-SYNCHRONIZER AND METHOD

BACKGROUND OF THE INVENTION

1. Field of the Invention

This invention is concerned with clocked systems which use a clock to measure time intervals.

2. Description of the Related Art

Many electronic systems and products require that time intervals be measured with high precision. This is typically accomplished using a high frequency, high accuracy oscillator to provide a clock signal to the system. The period of the clock signal establishes a time unit which the system can use to define or measure time intervals.

Such a system typically needs to have a continuous clock running for timing purposes, and the high frequency oscillator and its accompanying buffer can consume a considerable amount of current. In a system where power consumption is a key issue, such as a portable telephone, the continuous running of such a clock can quickly and undesirably deplete the battery.

There may be times when activity levels in the system are low, and the only requirement of the high frequency clock is to facilitate the activation of certain functions at a later point in time. During such a period, it may be advantageous from a power consumption standpoint to disable the high frequency clock, and to employ a lower frequency, less accurate, and lower power clock to measure time intervals—resulting in lower system power consumption. Unfortunately, the system may require such intervals to be timed as accurately as if the high frequency, high accuracy clock were still employed, which is generally not possible with the lower accuracy low frequency clock. A need exists for a system which allows the high frequency clock used to measure time intervals to be temporarily disabled, and while the high frequency clock is disabled, to employ a lower frequency, low power clock to measure time intervals with little to no loss of timing accuracy.

SUMMARY OF THE INVENTION

An asynchronous timing oscillator re-synchronizer system and method for use with a clocked system which uses a high frequency clock to measure time intervals is presented, which enables the clocked system to re-synchronize to the high frequency clock after it has been temporarily disabled. The re-synchronizer uses a low frequency, low power clock to determine the number of high frequency clock cycles that would have occurred during such intervals, with little to no loss of accuracy and with overall system power consumption reduced.

The invention is applicable to clocked systems which use a high frequency clock to measure time intervals. Both high frequency and low frequency clocks are provided to the re-synchronizer. A ratio between the frequencies of the high and low frequency clocks is determined and stored; the ratio is preferably periodically updated to correct for drift.

To disable the high frequency clock, a command is sent to the re-synchronizer which indicates that the high frequency clock is to be disabled for a specified number of cycles of the low frequency clock, referred to herein as the "disablement period". Disablement typically occurs during periods of low activity, to reduce the system's power consumption. In response to the disable command, a "clock-disable counter" causes the high frequency clock to be disabled, and begins counting low frequency clock cycles. When the disablement period has expired, the high frequency clock is re-enabled.

While the high frequency clock is disabled, a "missing high frequency clock cycles register" periodically increments the value stored in its register by the stored clock ratio, such that when the high frequency clock is re-enabled, the number in the missing high frequency clock cycles register represents the number of high frequency clock cycles that would have occurred during the disablement period. This number is provided to the clocked system, which can use it to adjust the timing in the system by adding in the cycles that were missed, thereby re-synchronizing the clocked system to the high frequency clock. Because the clock ratio is periodically updated to insure its accuracy, the number in the missing high frequency clock cycles register will accurately reflect the number of missed high frequency clock cycles, so that the use of the low frequency, low power clock during disablement periods incurs little to no loss of timing accuracy.

The high frequency clock typically includes an oscillator and a buffer which, when enabled, makes the oscillator output available to the clocked system. The high frequency clock can be disabled by disabling the oscillator, the buffer, or both. The oscillator is typically disabled by powering it down; when the oscillator is re-powered after having been powered down, a small amount of time is required for its frequency to stabilize. When configured to disable the high frequency clock by powering down the oscillator, the re-synchronizer preferably includes a stable time register, which stores the number of low frequency clock cycles required for the high frequency oscillator to stabilize. Using this number, the re-synchronizer re-enables the high frequency clock's oscillator prior to the expiration of the disablement period such that the oscillator is stable and ready to use at the end of the disablement period. The re-synchronizer can also be configured to disable only the buffer, with the oscillator allowed to run continuously; in this case, no stable time register is required. An external means of re-enabling the high frequency clock prior to the end of the requested disable time may also be provided.

Further features and advantages of the invention will be apparent to those skilled in the art from the following detailed description, taken together with the accompanying drawings.

DETAILED DESCRIPTION OF THE INVENTION

Figure 1:
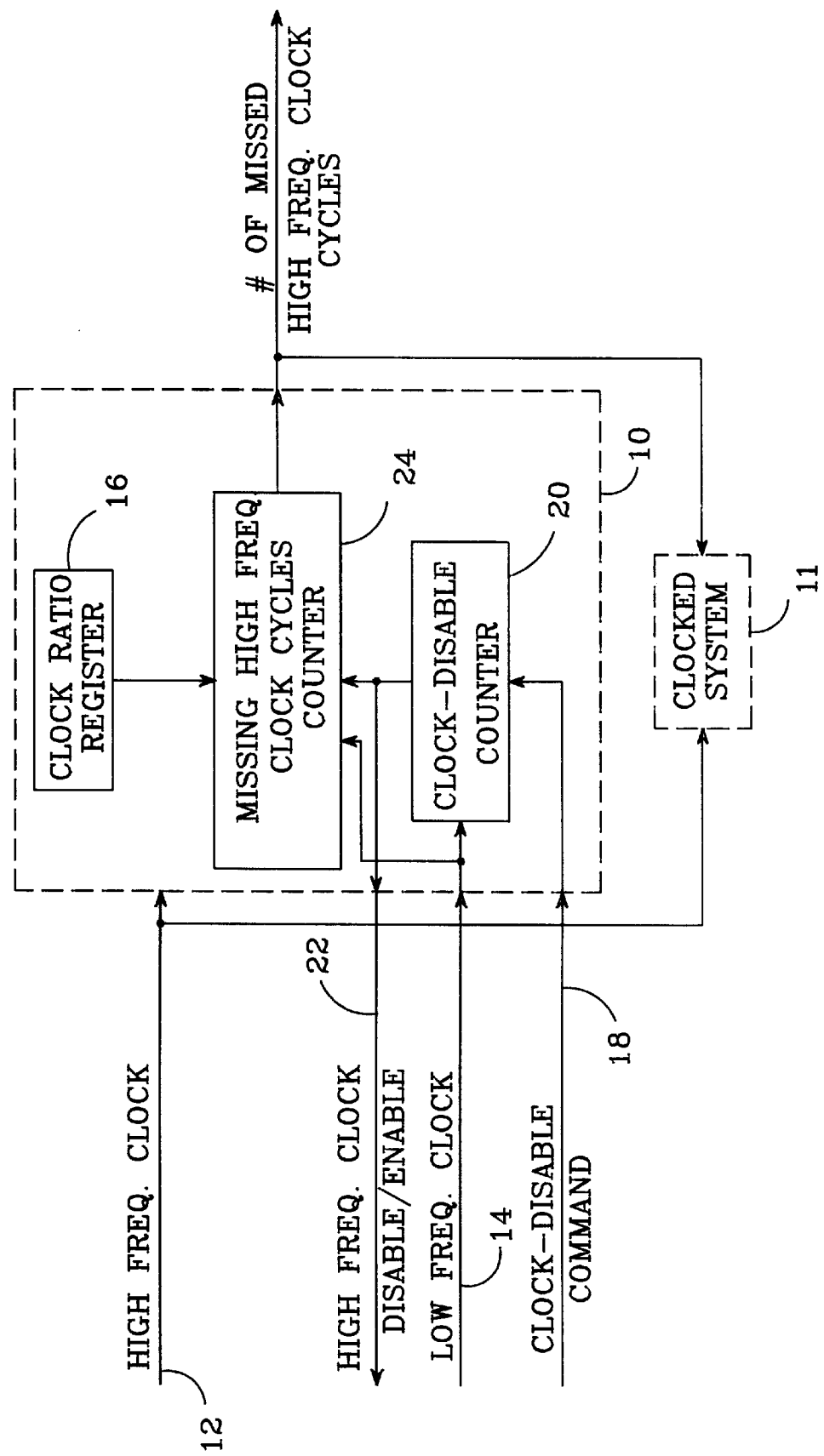
FIG. 1 is a block diagram illustrating the basic principles of the invention.

An asynchronous timing oscillator re-synchronizer 10 per the present invention is illustrated in FIG. 1. The invention is used with a clocked system 11 which uses a high frequency clock 12 to measure time intervals. For example, system 11 may schedule activities by defining numbers of cycles of the high frequency clock that must occur between activities. To implement the invention, a low frequency clock 14 is also provided to the re-synchronizer. As used herein, "high frequency clock" and "low frequency clock" are relative terms, which are intended to indicate only that the high frequency clock oscillates at a higher frequency than the low frequency clock. The specific circuitry of clocked system 11 is not relevant to the invention; a cellular phone is a typical application. Re-synchronizer 10 and clocked system 11 include a digital interface and controllers which enable values to be written and read from the registers and counters described below, as needed.

The ratio of the respective frequencies of the high and low frequency clocks is periodically determined, and stored in a clock ratio register 16. If the system in which the re-synchronizer is used determines that the high frequency clock is to be disabled, to reduce system power consumption during a period of inactivity, for example, it issues a "clock-disable command" 18, which is routed to a "clock-disable counter" 20. Along with requesting that the high frequency clock be disabled, the clock-disable command also includes information which indicates the time period for which the clock is to be off, referred to herein as the "disablement period".

One function of the clock-disable counter 20 is to time the disablement period. To facilitate this, the disablement period is defined as a number of low frequency clock cycles, which is loaded into counter 20. With the high frequency clock disabled, counter 20 is clocked with low frequency clock 14, counting down from the number loaded into it to zero. When the count reaches zero, the disablement period is complete.

The clock-disable counter 20 is also required to output a signal 22 which indicates whether the high frequency clock is to be enabled or disabled. Upon receipt of a clock-disable command, signal 22 is set to disable the high frequency clock. As discussed in more detail below, re-synchronizer 10 can be configured to disable the high frequency clock in a number of ways, including powering down the oscillator which generates the clock, disabling or powering down a buffer circuit placed between the oscillator and clocked system 11, or a combination of these. At the expiration of the disablement period, the clock-disable counter 20 re-enables the high frequency clock so that it is available for use by clocked system 11.

A "missing high frequency clock cycles register" 24 is used to determine the number of high frequency clock cycles that would have occurred during the disablement period. Register 24 receives high frequency clock enable/disable signal 22, low frequency clock 14, and the output of clock ratio register 16 as inputs, and initially holds a value of zero. When enable/disable signal 22 indicates that the high frequency clock is disabled, missing high frequency clock cycles register 24, for every cycle of the low frequency clock, increments its stored value by the number stored in the clock ratio register. Incrementing stops when enable/disable signal 22 indicates that the high frequency clock is re-enabled. At this point, the number stored in missing high frequency clock cycles register 24 represents the number of high frequency clock cycles that would have occurred during the disablement period. This number is provided to clocked system 11, which can use it to adjust the timing in the system by adding in the high frequency clock cycles that were missed, and thereby re-synchronize the clocked system to the high frequency clock.

Figure 2:
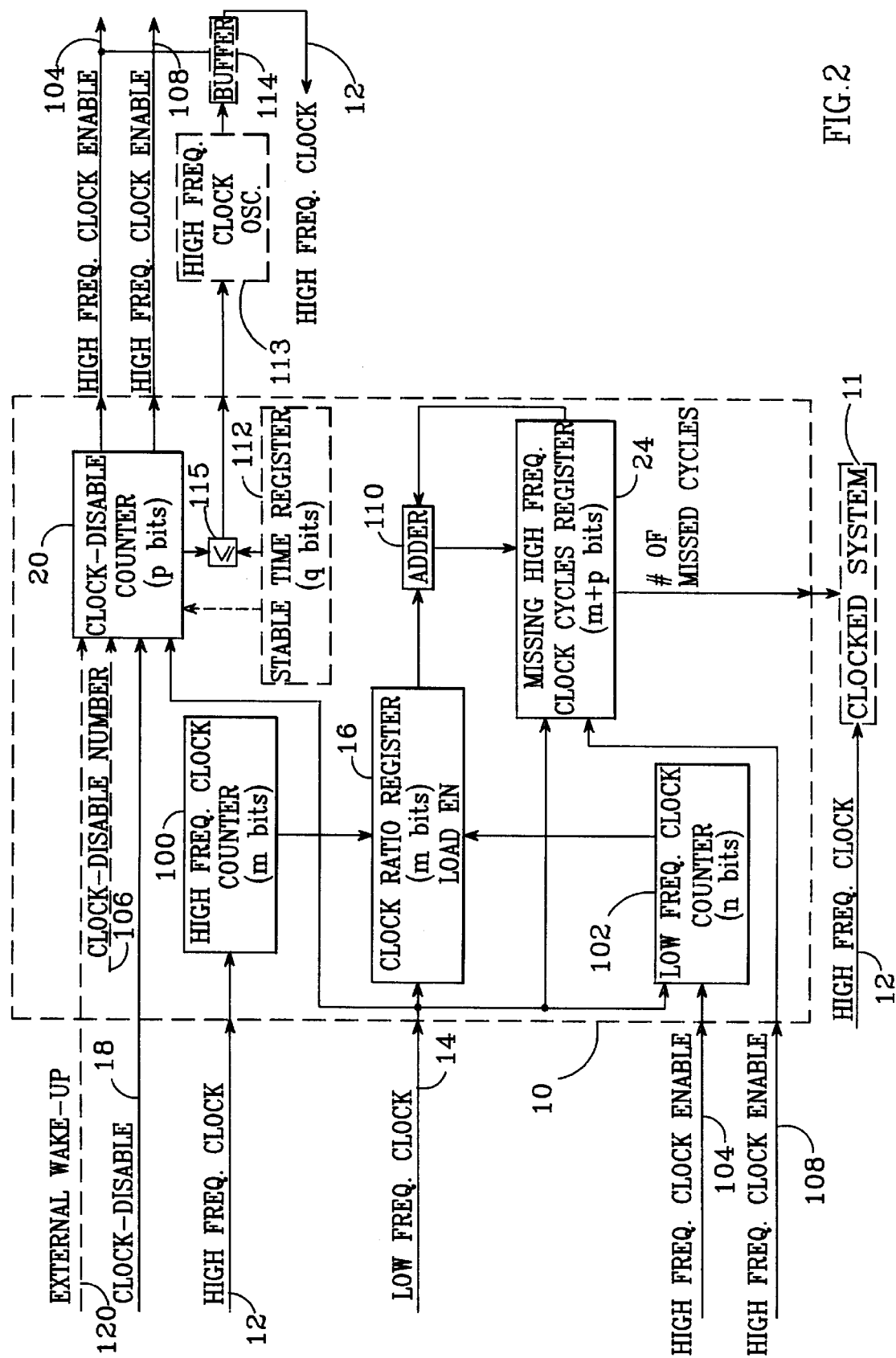
FIG. 2 is a more detailed block diagram of the invention.

A preferred implementation of the re-synchronizer is shown in FIG. 2. As in FIG. 1, clocked system 11 is clocked with high frequency clock 12, and asynchronous timing oscillator re-synchronizer 10 receives high frequency clock 12 and low frequency clock 14. A high frequency clock counter 100 and a low frequency clock counter 102 are clocked by high and low frequency clocks 12 and 14, respectively, and are used to determine the clock ratio stored in clock ratio register 16. High frequency clock counter 100 is m bits wide, and low frequency clock counter 102 is n bits wide. Counters 100 and 102 are connected to interact with clock ratio register 16 as follows: both counters are initially set to zero, and begin counting the cycles of their respective clocks simultaneously. If a clock-disable command is received, both high and low frequency clock counters 100 and 102 suspend counting until the high frequency clock is re-enabled (as discussed in more detail below). When low frequency clock counter 102 reaches its maximum value ($2^n$), it causes clock ratio register 16 to load the value in high frequency clock counter 100. Thus, clock ratio register 16 stores the number of cycles of high frequency clock 12 that occur during $2^n$ cycles of low frequency clock 14. Both counters are then reset to zero, and the process is repeated. In this way, the number stored in clock ratio register 16 is updated once for every $2^n$ cycles of the low frequency clock, so that the system continually calibrates the slower clock with respect to the faster clock, and thus the clock ratio register tracks any drift in the ratio caused by temperature or other factors. In order to accommodate the same range of values as the m-bit wide high frequency clock counter 100, the clock ratio register 16 should be at least m bits wide. To prevent the m-bit wide high frequency clock counter from overflowing, the bit-size of the high and low frequency clock counters (values m and n, respectively) should be selected such that, with both clocks continuously running, $2^n$ cycles of the low frequency clock take less time than $2^m$ cycles of the high frequency clock under all conditions.

It is not essential that the high and low frequency clocks run continuously to maintain the calibration of the clock ratio. As noted above, both counters 100 and 102 suspend counting when the high frequency clock is disabled. This is preferably accomplished by enabling low frequency clock counter 102 only upon receipt of a signal 104 (HIGH FREQ. CLOCK ENABLE, discussed below) which indicates that high frequency clock 12 is enabled. Then, when high frequency clock 12 is disabled, counter 100 suspends counting due to the absence of the high frequency clock, and counter 102 stops due to the state of enable signal 104. When high frequency clock 12 is re-enabled, counters 100 and 102 resume counting where they left off, and a new clock ratio will be established when counter 102 reaches $2^n$ cycles of low frequency clock 14. In this way, calibration of the clock ratio is maintained even over discontinuous periods of high frequency clock operation. Of course, since the counting of the low frequency clock is inhibited during periods when the high frequency clock is disabled, the elapsed time to acquire $2^n$ cycles of the low frequency clock may be longer than $2^n$ periods of the low frequency clock.

As clock ratio register 16 contains the number of high frequency clock cycles that occurred in $2^n$ cycles of the low frequency clock (as opposed to a single cycle of the low frequency clock), the binary number held in the clock ratio register can be regarded as representing the actual ratio of the clocks' frequencies in 2 parts: (i) The most significant (m−n) bits of the clock ratio register represent the integer part of the clock frequency ratio, and (ii) the least significant n bits of the clock ratio register represent the fractional part of the clock frequency ratio.

As in FIG. 1, the asynchronous timing oscillator re-synchronizer in FIG. 2 includes a clock-disable counter 20, which receives low frequency clock 14 and clock-disable command 18 as inputs. The clock-disable counter 20 is made p-bits wide, which establishes the maximum duration of the disablement period at $2^p$ cycles of the low frequency clock. There are several methods by which the number of low frequency clock cycles corresponding to the disablement period, referred to herein as "y" cycles of the low frequency clock, can be loaded into clock-disable counter 20. For example, the number y can be embedded in the clock-disable command itself. Alternatively, the number y can be loaded into counter 20 as a settable or hard-coded "clock-disable number" 106, which is loaded into the counter upon receipt of a clock-disable command. If the disablement period is to always be the same, the number y can be hard-coded into counter 20.

As shown in FIG. 2, clock-disable counter 20 outputs a high frequency clock enable signal 104, and a high frequency clock enable signal 108, which indicate when high frequency clock 12 is available to clocked system 11. As soon as the value in clock-disable counter 20 becomes greater than zero, signal 104 goes low and signal 108 goes high, and counter 20 begins decrementing its loaded value (y) by one for every cycle of the low frequency clock. When the count reaches zero, y cycles of the low frequency clock have occurred. With the disablement period complete, high frequency clock enable signals 104 and 108 change state, and the high frequency clock is again made available to clocked system 11.

Missing high frequency clock cycles register 24 receives low frequency clock 14 and high frequency clock enable signal 108 as inputs. The register 24 is arranged to increment the value it is holding (initially set equal to zero) by the number in the clock ratio register 16 once for every cycle of the low frequency clock. This is preferably accomplished with the use of an adder circuit 1 10, which receives the clock ratio and the value stored in register 24 as inputs, and outputs their sum to register 24. When high frequency clock enable goes high, indicating that the high frequency clock is disabled, the missing high frequency clock cycles register 24 is enabled. While enabled, each cycle of the low frequency clock causes the register's present value to be added to the value in clock ratio register 16, with the sum stored back into register 24.

Because the disablement period is allowed to be up to $2^p$ cycles of the low frequency clock, and the clock ratio register 16 may hold values ranging up to $2^m$, the missing high frequency clock cycles register 24 should be at least m+p bits wide. At the end of the disablement period, the value in register 24 represents the number of high frequency clock cycles that would have occurred had the high frequency clock remained on. If register 24 is m+p bits wide, its (m+p)–n most significant bits represent the integer portion of the value stored in register 24, with the remaining n bits representing fractional information. This value is made available to clocked system 11, which can use it to re-synchronize the clocked system to the high frequency clock.

High frequency clock 12 is preferably generated by an oscillator 113 and a buffer 114; when the buffer is enabled, it allows the oscillator output to be passed on to clocked system 11. When so configured, there are several methods by which high frequency clock 12 can be disabled: by disabling and/or powering down the oscillator 113, disabling and/or powering down the buffer 114, or some combination of these. The maximum reduction in system power consumption is realized when both the oscillator and buffer are powered down. However, when oscillator 113 is powered up after having been powered down, a particular amount of time must pass before the oscillator output becomes stable enough for use in the clocked system, which is often subject to a stability specification.

When configured to disable high frequency clock 12 by powering down oscillator 113, the re-synchronizer preferably includes a stable time register 112. The amount of time required for the high frequency oscillator output to stabilize is defined as a number x of low frequency clock cycles, and x is stored into stable time register 112. Upon receipt of clock-disable command 18, the number y of low frequency clock cycles corresponding to a desired disablement period is loaded into clock-disable counter 20, which decrements its value by one for every cycle of the low frequency clock. A comparison circuit 115 continuously compares the value in counter 20 with the value x in the stable time register 112. While the value in counter 20 is greater than x (as would typically occur as soon as y is loaded into counter 20), the high frequency clock oscillator 113 is powered down. When the value in counter 20 becomes equal to or less than x (which occurs after counting y–x cycles of the low frequency clock), oscillator 113 is powered back up. The oscillator's buffer 114 is not yet enabled, however, because the oscillator's output frequency has not yet stabilized, and because the disablement period has not expired. When the clock-disable counter as counted y cycles of the low frequency clock, signaling the end of the disablement period, clock-disable counter 20 toggles the high frequency clock enable signal, enabling buffer 114 and thereby allowing the oscillator output, which should now be stabilized, to be provided to the clocked system circuitry.

Note that the operational sequence described above is merely exemplary: there are numerous ways in which clock-disable counter 20 and stable time register 112 can be arranged to provide the same functionality as that described here. For example, counter 20 could be arranged to count up rather than down, and to re-enable buffer 114 when it has counted up to the number y of low frequency clock cycles which corresponds to the disablement period.

It is not essential that a stable time register be employed. However, if power consumption is to be reduced by powering down the high frequency clock oscillator, a stable time register should be used to ensure the accuracy of time measurements. If there is no mechanism for allowing a stabilization time, the indeterminate frequency at which the oscillator oscillates prior to its becoming stable is passed onto the clocked system and used to measure time intervals. Such measurements will inevitably be inaccurate. Thus, if the high frequency clock oscillator is powered down during disablement periods, the use of a stable time register is strongly recommended.

Alternatively, the high frequency clock can be disabled by simply disabling buffer 114. Though the oscillator 113 is allowed to continuously run, this approach is still likely to result in a considerable power savings: the high frequency clock is typically delivered to a number of nodes within clocked system 11, each of which has an associated capacitance which must be driven by buffer 114. The power that would normally be required to drive the capacitance is saved when the buffer is disabled and the nodes are no longer driven. When this approach is taken, there is no oscillator stabilization time to accommodate, making the stable time register unnecessary.

An "external wake-up" option may also be provided, which allows the high frequency clock to be re-enabled prior to the expiration of the disablement period. An external wake-up signal 120 may be connected to clock-disable counter 20. For an implementation which includes a stable time register and accounts for the high frequency clock oscillator's stabilization time, upon receipt of external wake-up signal 120, clock-disable counter 20 will 'jump' to the value in the stable time register (unless it is already less than this value). This causes high frequency clock oscillator 113 to be re-enabled immediately. When clock-disable counter 20 reaches zero, high frequency clock buffer 114 is re-enabled and high frequency clock 12 is made available to clocked system 11. As missing high frequency clock cycles register 24 is only incremented during the period that high frequency clock buffer 114 is disabled (in accordance with high frequency clock enable signals 104 and 108), its count of the number of missed cycles will still be accurate, even though the high frequency clock was disabled for fewer than the programmed number of low frequency clock cycles.

The following example is given to illustrate the operation of a re-synchronizer which includes a stable time register. Assume that a clocked system such as a cellular telephone has the following requirements:

a. A main system (high frequency) clock which operates at 13 MHz.

b. A standby (low frequency) clock which operates at 32.768 kHz. The high frequency clock is disabled when the system is in "standby" mode.

c. Required timing accuracy following standby periods: approximately 30 ppm.

d. Longest standby period: <2 seconds.

e. High frequency clock stabilization time: 5 ms.

The size n of low frequency clock counter 102 is defined by the requirement that a timing accuracy of about 30 ppm be maintained during standby periods. The standby clock provides 32,768 cycles per second; 30 ppm is about 1 count in 32,768 ($1/32768$=30.5 ppm), which is 1 count in $2^{15}$. Thus, for this example, low frequency clock counter 102 should be at least n=15 bits wide.

The size m of high frequency clock counter 100 and clock ratio register 16 is defined by the expected clock ratio. Here, the ratio is given by 13 MHz/32.768 kHz 396.73. The high frequency clock counter is sized to accommodate the number of cycles of the high frequency clock 12 that occur during $2^n$ cycles of the low frequency clock. In this case (with n=15), $2^n$=32,768 cycles, so that 32,768×396.73≈13,000,000 cycles of the high frequency clock occur during $2^n$ cycles of the low frequency clock. To accommodate this many cycles of high frequency clock 12, counter 100 and clock ratio register 16 should be at least m=24 bits wide ($2^{24}$≈16,000,000).

The size p of clock-disable counter 20 is defined by the longest standby period. The low frequency clock has a period of 30.52 µs (=1/32,768 kHz); thus, about 2 s/30.52 µs=65,536=$2^{16}$ cycles of the low frequency clock will occur in 2 seconds. For this example, then, clock-disable register 20 should be at least p=16 bits wide.

With m and p known, the size of missing high frequency clock cycles register 24 is defined as m+p=24+16=40 bits wide. The (m+p)−n=25 most significant bits of the register value give the integer portion of the count, and the remaining n=15 bits give the fractional portion.

The size q of stable time register 12 is defined by the required high frequency stabilization time of 5 ms. With a period of 30.52 µs, about 164 cycles of the low frequency clock will occur in 5 ms. Making stable time register 12 at least q=8 bits wide ($2^8$=256) will accommodate the 5 ms stabilization time.

The following is an example of the system in operation. A "d" following a number indicates that it is a decimal value, while a "b" indicates a binary number. Assume that both clocks have been running for at least one second. During this time, low frequency clock counter 102 will have counted up to 32,768d, and high frequency clock counter 100 will have counted up to 13,000,000 (1100 0110 0101 1101 0100 0000b). The value in high frequency clock register 100 is loaded into clock ratio register 16 after every $2^n$ cycles of the low frequency clock 14; thus, 13,000,000d is the value loaded into clock ratio register 16. As noted above, the most significant (m−n) bits of the clock ratio represent the integer portion of the ratio, and the remaining n bits represent the fractional portion. Here, the most significant m−n=9 bits are 110001100b=396d, and the remaining n=15 bits are 101110101000000b=23,872d, which, when divided by 32,768d, give a fractional portion of 23,872d/32,768d=0.7285d. In this way, low frequency clock 14 is calibrated with respect to high frequency clock 12, with the calibration updated once per second as long as the high frequency clock is enabled.

The clocked system 11 will program a value of 164d=1010 0011b into stable time register 112, since 164 cycles of the low frequency clock is about 5 ms.

At some point, clocked system 11 sends a clock-disable command to disable the high frequency clock for 1024d cycles of the low frequency clock (~31.25 ms). The binary equivalent of 1024d, i.e., 100 0000 0000b, is loaded into clock-disable counter 20. With the value in counter 20 being greater than zero, high frequency clock enable signal 104 goes low, and high frequency clock enable signal 108 goes high, disabling buffer 114. Because the value in counter 20 is greater than 164d (the stabilization time in number of low frequency clock cycles), the high frequency oscillator 113 is also disabled.

During the disablement period, the value in missing high frequency clock cycles register 24 is incremented by the stored clock ratio of 13,000,000d for every cycle of the low frequency clock.

When clock-disable counter 20 has counted 860d cycles of the low frequency clock, its value will have fallen from 1024d to the value stored in stable time register 112 (i.e., 164d). Because the value in clock-disable counter 20 is no longer greater than the value in stable time register 1 12, high frequency clock oscillator 113 is re-enabled. After clock-disable counter 20 has counted down another 164d low frequency clock cycles and reached zero, high frequency clock buffer 114 is re-enabled, and the stabilized high frequency clock is made available to clocked system 11.

When high frequency clock buffer 114 is re-enabled, high frequency clock enable signal 108 goes low and missing high frequency clock cycles register 24 stops incrementing. Because 1024d cycles of the low frequency clock occurred during the disablement period, the value in missing high frequency clock cycles register 24 will be: 13,000,000d× 1024d=13,312,000,000d, or 0000 0011 0001 1001 0111 0101 0000 0000 0000 0000b. The (m+p)−n=25 most significant bits: 0 0000 0110 0011 0010 1110 1010b=406250d. The remaining n=15 bits: 000 0000 0000 0000b=0.0d.

The value 406250d is provided to clocked system 11, indicating that 406,250 cycles of the high frequency clock would have occurred during the disablement period.

The slower clock is continuously being calibrated against the faster clock, so that the clock ratio used in calculating the number of missed cycles can change from one disablement period to the next, ensuring that factors such as temperature drift are corrected for regularly. As a result, the re-synchronizer's calculation of missed cycles is likely to be an accurate reflection of the actual number of high frequency clock cycles that would have occurred during a disablement period.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

I claim:

1. An asynchronous timing oscillator re-synchronizer which enables a high frequency clock used to measure time intervals in a clocked system to be temporarily disabled without significant loss of timing accuracy, comprising:
   a clock ratio register arranged to, for a clocked system which receives a high frequency clock and a low frequency clock and which normally measures time intervals with said high frequency clock, periodically store a clock ratio given by the number of high frequency clock cycles that occur during a predetermined number of low frequency clock cycles;
   a clock-disable counter connected to receive said low frequency clock and a clock-disable command which indicates that said high frequency clock is to be disabled for a disablement period defined as a specified number of low frequency clock cycles as inputs, said clock-disable counter arranged to, upon receipt of said clock-disable command, output a signal which disables said high frequency clock, begin counting low frequency clock cycles, and output a signal which re-enables said high frequency clock when said specified number of low frequency clock cycles has occurred; and
   a missing high frequency clock cycles register which receives said low frequency clock and a signal which indicates that said high frequency clock is disabled as inputs, said missing high frequency clock cycles register arranged to, while said high frequency clock is disabled, periodically increment the value stored in its register by said clock ratio such that the number stored in said missing high frequency clock cycles register when said high frequency clock is re-enabled represents the number of high-frequency clock cycles that would have occurred during said disablement period, said number stored in said missing high frequency clock cycles register at the end of said disablement period provided to said clocked system and enabling said clocked system to be re-synchronized with said high frequency clock.

2. The re-synchronizer of claim 1, further comprising an m-bit high frequency clock counter which counts the cycles of said high frequency clock and an n-bit low frequency clock counter which counts the cycles of said low frequency clock, said high frequency clock counter connected to provide a count of the number of cycles of said high frequency clock that occur during $2^n$ cycles of said low frequency clock to said clock ratio register, said count provided to said clock ratio register being said clock ratio, m and n selected such that ($2^n$×the period of said low frequency clock) is less than ($2^m$×the period of said high frequency clock).

3. The re-synchronizer of claim 2, wherein said clock ratio register is m bits wide, the most significant (m−n) bits of said clock ratio stored in said clock ratio register representing the integer portion of said ratio and the least significant n bits representing the fractional part of said ratio.

4. The re-synchronizer of claim 3, wherein said specified number of low frequency clock cycles which define said disablement period is less than or equal to $2^p$ and said missing high frequency clock cycles register is (m+p) bits wide, said missing high frequency clock cycles register incrementing its stored value by said clock ratio for each cycle of said low frequency clock that occurs during said disablement period, the most significant (m+p)−n bits of the value stored in said missing high frequency clock cycles register when said high frequency clock is re-enabled representing the integer portion of the number of high frequency clock cycles that would have occurred during said disablement period and the least significant n bits of said value representing the fractional part of said number of high frequency clock cycles that would have occurred during said disablement period.

5. The re-synchronizer of claim 1, further comprising an adder connected to receive said clock ratio at a first input and the value stored in said missing high frequency clock cycles register at a second input, said adder arranged to produce the sum of said inputs at an output, said adder output connected to increment the value stored in said missing high frequency clock cycles register by the clock ratio.

6. The re-synchronizer of claim 1, wherein said high frequency clock is generated by an oscillator and a buffer, said buffer when enabled allowing the output of said oscillator to be provided to said clocked system, said clock-disable counter arranged to disable said high frequency clock by disabling said buffer, and to enable said high frequency clock by enabling said buffer.

7. The re-synchronizer of claim 1, wherein said high frequency clock is generated by an oscillator and a buffer, said buffer when enabled allowing the output of said oscillator to be provided to said clocked system, said clock-disable counter arranged to disable and enable said high frequency clock by disabling and enabling said buffer, respectively, said re-synchronizer further comprising a stable time register which stores a value x equal to the number of low frequency clock cycles required for the output frequency of said high frequency oscillator to become stable after being powered up, said re-synchronizer arranged to compare the value in said clock-disable counter with x and to power down said oscillator when the number of cycles remaining in a disablement period is greater than x and to power said oscillator back up when the number of cycles remaining in a disablement period is equal to or less than x such that said high frequency oscillator is stable by the expiration of said disablement period.

8. The re-synchronizer of claim 7, wherein said stable time register is q-bits wide and said number of low frequency clock cycles required for said high frequency oscillator to become stable is less than or equal to $2^q$.

9. The re-synchronizer of claim 8, wherein said clock-disable counter is arranged to receive an external wakeup signal, said clock-disable counter when said external wakeup signal is received loading the value stored in said stable time register such that said high frequency clock oscillator is immediately re-enabled.

10. The re-synchronizer of claim 1, wherein said clock-disable counter is arranged to receive an external wakeup signal which enables said high frequency clock to be re-enabled prior to the expiration of said disablement period.

11. An asynchronous timing oscillator re-synchronizer which enables a high frequency clock used to measure time intervals in a clocked system to be temporarily disabled without significant loss of timing accuracy, comprising:
   a high frequency clock oscillator;
   a high frequency clock buffer connected to said oscillator which, when enabled, makes the output of said oscillator available as a high frequency clock;

a high frequency clock counter which counts the cycles of said high frequency clock;

a low frequency clock counter which counts the cycles of a low frequency clock, said high and low frequency clocks used in a clocked system which normally measures time intervals with said high frequency clock;

a clock ratio register connected to said high and low frequency clock counters and arranged to periodically store a clock ratio given by the number of high frequency clock cycles that occur during a predetermined number of low frequency clock cycles;

a clock-disable counter connected to receive said low frequency clock and a clock-disable command which indicates that said high frequency clock is to be disabled for a disablement period defined as a specified number y of low frequency clock cycles as inputs;

a stable time register which stores a value x representing the number of low frequency clock cycles required for the output frequency of said high frequency clock oscillator to become stable after being powered up, said clock-disable counter arranged to, upon receipt of said clock-disable command, load said specified number y, power down said high frequency clock oscillator, disable said buffer, and decrement said loaded number by one for each cycle of said low frequency clock, said clock-disable counter and said stable time register arranged to power said high frequency clock oscillator back up when said clock-disable counter counts down to the value x stored in said stable time register and to re-enable said high frequency clock buffer when y low frequency clock cycles have occurred; and a missing high frequency clock cycles register which receives said low frequency clock and a signal which indicates that said high frequency clock is disabled as inputs, said missing high frequency clock cycles register arranged to, while said high frequency clock is disabled, periodically increment the value stored in its register by said clock ratio such that the number stored in said missing high frequency clock cycles register when said high frequency clock is re-enabled represents the number of high-frequency clock cycles that would have occurred during said disablement period, said number stored in said missing high frequency clock cycles register at the end of said disablement period provided to said clocked system and enabling said clocked system to be re-synchronized with said high frequency clock.

12. The re-synchronizer of claim 11, wherein said clock ratio register and said high frequency clock counter are m bits wide and said low frequency clock counter is n bits wide, said high frequency clock counter connected to provide a count of the number of cycles of said high frequency clock that occur during $2^n$ cycles of said low frequency clock to said clock ratio register, said count being said clock ratio, m and n selected such that ($2^n$×the period of said low frequency clock) is less than ($2^m$×the period of said high frequency clock), the most significant (m−n) bits of said clock ratio stored in said clock ratio register representing the integer portion of said ratio and the least significant n bits representing the fractional part of said ratio.

13. The re-synchronizer of claim 12, wherein said specified number of low frequency clock cycles which define said disablement period is less than or equal to $2^p$ and said missing high frequency clock cycles register is (m+p) bits wide, said missing high frequency clock cycles register incrementing its stored value by said clock ratio for each cycle of said low frequency clock that occurs during said disablement period, the most significant (m+p)−n bits of the value stored in said missing high frequency clock cycles register when said high frequency clock is re-enabled representing the integer portion of the number of high frequency clock cycles that would have occurred during said disablement period and the least significant n bits representing the fractional part of said number of high frequency clock cycles that would have occurred during said disablement period.

14. The re-synchronizer of claim 13, further comprising an adder connected to receive said clock ratio at a first input and the value stored in said missing high frequency clock cycles register at a second input, said added arranged to produce the sum of said inputs at an output, said adder output connected to increment the value stored in said missing high frequency clock cycles register by said clock ratio.

15. The re-synchronizer of claim 11, wherein said stable time register is q bits wide and the number of low frequency clock cycles required for said high frequency clock oscillator to become stable is less than or equal to $2^q$.

16. The re-synchronizer of claim 11, wherein said re-synchronizer is arranged to receive an external wakeup signal, said clock-disable counter when said external wakeup signal is received loading the value in said stable time register such that said high frequency clock oscillator is immediately re-enabled.

17. The re-synchronizer of claim 11, further comprising a comparison circuit connected to compare the value x in said stable time register with the value in said clock-disable counter, said comparison circuit arranged to power down said oscillator when the value in said clock-disable counter is greater than x, and to power said oscillator up when the value in said clock-disable counter is equal to or less than x.

18. A method of re-synchronizing a clocked system to a high frequency clock used to measure time intervals after said high frequency clock is temporarily disabled, comprising the steps of:

providing a high frequency clock and a low frequency clock to a clocked system which normally uses said high frequency clock to measure time intervals;

determining a clock ratio given by the number of cycles of said high frequency clock that occur for a given number of cycles of said low frequency clock;

disabling said high frequency clock;

incrementing a value by said clock ratio for each cycle of said low frequency clock that occurs while said high frequency clock is disabled, said incremented value representing the number of cycles of said high frequency clock that would have occurred while said high frequency clock was disabled;

re-enabling said high frequency clock; and providing said incremented value to said clocked system, said incremented value enabling said clocked system to re-synchronize with said high frequency clock.

19. The method of claim 18, wherein said clock ratio is periodically updated to reduce inaccuracy in said incremented value due to drift in said clock ratio.

20. The method of claim 19, wherein said clock ratio is determined by counting the cycles of said high frequency clock that occur during a predetermined number of cycles of said low frequency clock.

21. The method of claim 20, further comprising the steps of suspending the counting of said high and low frequency clock cycles when said high frequency clock is disabled and resuming the counting of said high and low frequency clock cycles when said high frequency clock is re-enabled such that said clock ratio is periodically updated across discontinuous periods of said high frequency clock's operation.

22. The method of claim 18, wherein said high frequency clock is disabled for a specified number y of low frequency clock cycles, said method further comprising the steps of counting the number of low frequency clock cycles that occur while said high frequency clock is disabled and re-enabling said high frequency clock when said specified number of low frequency clock cycles has occurred.

23. The method of claim 22, wherein said high frequency clock comprises a high frequency clock oscillator and a buffer which, when enabled, provides the output of said high frequency oscillator to said clocked system, said method further comprising the steps of determining the number x of low frequency clock cycles that are required for said high frequency clock oscillator to become stable after being powered up, said step of disabling said high frequency clock comprising powering down said oscillator and disabling said buffer, said step of re-enabling said high frequency clock comprising powering up said oscillator after said high frequency clock has been disabled for y–x cycles of said low frequency clock and re-enabling said clock buffer when said high frequency clock has been disabled for y cycles of said low frequency clock.

24. The method of claim 18, wherein said high frequency clock comprises a high frequency clock oscillator which is arranged to run continuously and a buffer which, when enabled, provides the output of said high frequency oscillator to said clocked system, said step of disabling said high frequency clock comprising disabling said buffer and said step of re-enabling said high frequency clock comprising re-enabling said buffer.

* * * * *